(12) United States Patent
Heyne et al.

(10) Patent No.: US 12,547,546 B2
(45) Date of Patent: Feb. 10, 2026

(54) PROCESSING TENSORS

(71) Applicant: INTERNATIONAL BUSINESS MACHINES CORPORATION, Armonk, NY (US)

(72) Inventors: Julian Heyne, Stuttgart (DE); Razvan Peter Figuli, Remchingen (DE); Cedric Lichtenau, Stuttgart (DE); Holger Horbach, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 18/046,322

(22) Filed: Oct. 13, 2022

(65) Prior Publication Data

US 2024/0135158 A1 Apr. 25, 2024

(51) Int. Cl.
*G06F 12/0882* (2016.01)
(52) U.S. Cl.
CPC .................. *G06F 12/0882* (2013.01)
(58) Field of Classification Search
CPC .. G06F 12/0882; G06F 12/04; G06F 12/0223; G06F 2212/1016; G06F 2212/1044; G06F 12/0207; G06F 2212/454; G06F 2212/455; G06T 1/60
USPC ................ 706/12, 15, 16, 20, 25, 26, 33, 41
See application file for complete search history.

(56) References Cited

U.S. PATENT DOCUMENTS

| | | | |
|---|---|---|---|
| 9,880,744 B1 * | 1/2018 | Dalal | G06F 3/0688 |
| 10,630,312 B1 | 4/2020 | Giamei et al. | |
| 2002/0010793 A1 | 1/2002 | Noll et al. | |
| 2004/0073771 A1 | 4/2004 | Chen et al. | |
| 2017/0139709 A1 * | 5/2017 | Gschwind | G06F 9/30112 |
| 2018/0165574 A1 | 6/2018 | Young | |

(Continued)

FOREIGN PATENT DOCUMENTS

| | | |
|---|---|---|
| CN | 1501259 A | 6/2004 |
| CN | 107924291 A | 4/2018 |

(Continued)

OTHER PUBLICATIONS

Adiono et al., "Low Latency YOLOv3-Tiny Accelerator for Low-Cost FPGA Using General Matrix Multiplication Principle", IEEE Access, date of current version Oct. 25, 2021, 24 pages.

(Continued)

*Primary Examiner* — Md I Uddin
(74) *Attorney, Agent, or Firm* — Stephen R. Yoder

(57) ABSTRACT

The present disclosure relates to a method of accessing a n-dimensional tensor of elements in a memory by a computer system. The multidimensional tensor comprises two-dimensional arrays, herein referred to as pages, each page being configured to comprise a predefined number of one-dimensional arrays of elements, herein referred to as sticks. The method includes linearly loading page per page of the tensor, and doing the following for each page: loading the non-empty sticks of the page from the memory using a base address of the page and determining a base address for the subsequent page using the number of loaded sticks and using an address offset indicative of potential empty sticks of the page. In case the number of loaded pages reaches a chunk size, the chunk page counter may be reinitialized and the linear loading may be continued with a subsequent page.

16 Claims, 13 Drawing Sheets

(56) References Cited

U.S. PATENT DOCUMENTS

| | | | |
|---|---|---|---|
| 2018/0253252 | A1 | 9/2018 | Yamamoto et al. |
| 2019/0042250 | A1 | 2/2019 | Anders |
| 2019/0079768 | A1 | 3/2019 | Heinecke |
| 2020/0005128 | A1 | 1/2020 | Temam |
| 2020/0081744 | A1 | 3/2020 | Siegl |
| 2020/0104691 | A1 | 4/2020 | Bai |
| 2020/0326948 | A1* | 10/2020 | Langhammer ....... H03K 19/177 |
| 2021/0065005 | A1 | 3/2021 | Zhu |
| 2021/0182059 | A1* | 6/2021 | Akin ................... G06F 9/30134 |
| 2021/0192359 | A1 | 6/2021 | Khish Ardestani Zadeh |
| 2021/0224125 | A1 | 7/2021 | Liu |
| 2021/0264250 | A1 | 8/2021 | Singh |
| 2022/0027546 | A1 | 1/2022 | Ren et al. |

FOREIGN PATENT DOCUMENTS

| | | |
|---|---|---|
| CN | 113383309 A | 9/2021 |
| CN | 113836049 A | 12/2021 |
| WO | 2021119907 A1 | 6/2021 |

OTHER PUBLICATIONS

Anonymous. ""RDNA 2" Instruction Set Architecture." Published Nov. 30, 20 by AMD. 291 pages. https://developer.amd.com/wp-content/resources/RDNA2_Shader_ISA_November2020.pdf.

Anonymous. "Parallel Thread Execution ISA." Published Oct. 2022 by NVIDIA. 516 pages. https://docs.nvidia.com/cuda/parallel-thread-execution/index.html#texture-instructions-tld4.

Anonymous. "Unit Description." Printed Oct. 13, 2021. 43 pages. Published by NVDLA. http:/nvdla.org/hw/v1/ias/unit_description.html.

Dave, et al., "Hardware Acceleration of Sparse and Irregular Tensor Computations of ML Models: A Survey and Insights." Last edited Jul. 22, 2021. 44 pages. Published by ARXIV. https://arxiv.org/abs/2007.00864v2.

IBM Appendix P, "List of patents and patent applications to be treated as related", Filed Oct. 13, 2022, 2 pages.

Lichtenau, et al., "Padding Input Data for Artificial Intelligence Accelerators." U.S. Appl. No. 17/652,109, filed Feb. 23, 2022.

"Patent Cooperation Treaty PCT International Search Report", Applicant's file reference P202100599PCT01, International application No. PCT/IB2023/051533, International filing date Feb. 20, 2023, Date of mailing Jun. 19, 2023, 6 pages.

* cited by examiner

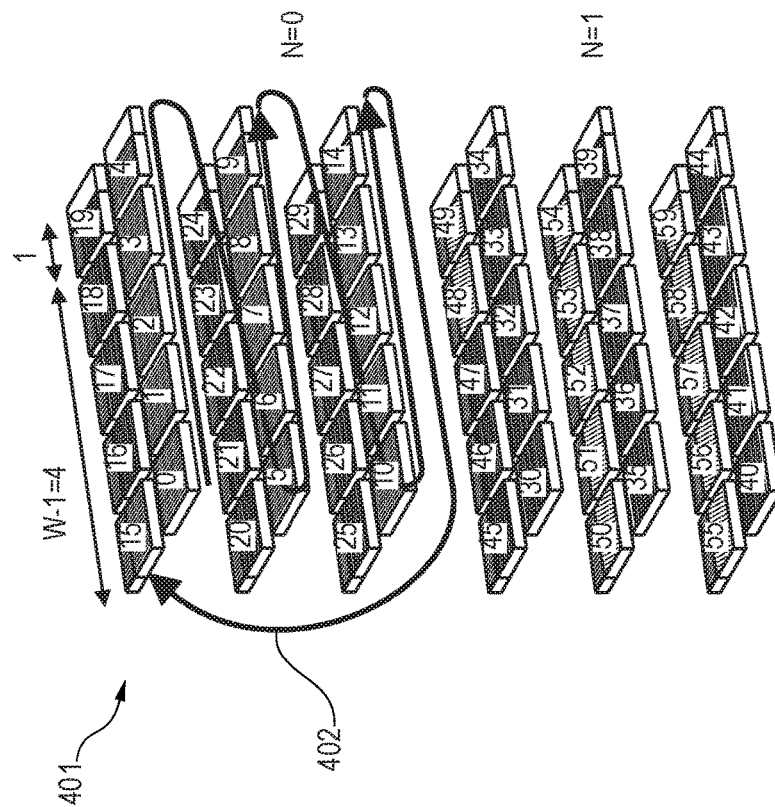
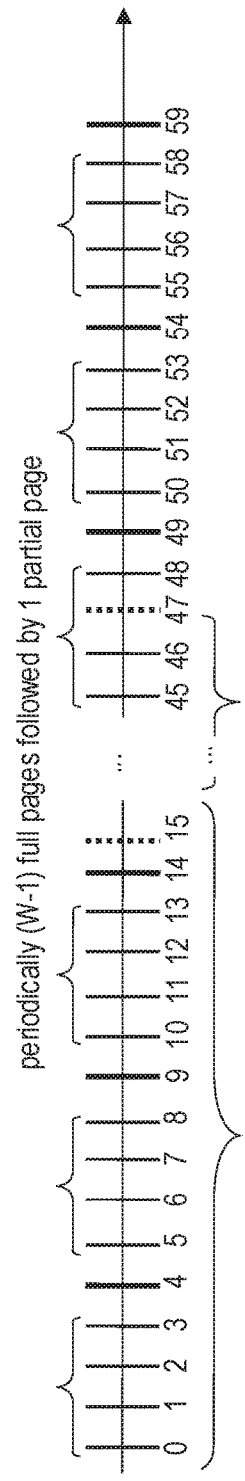

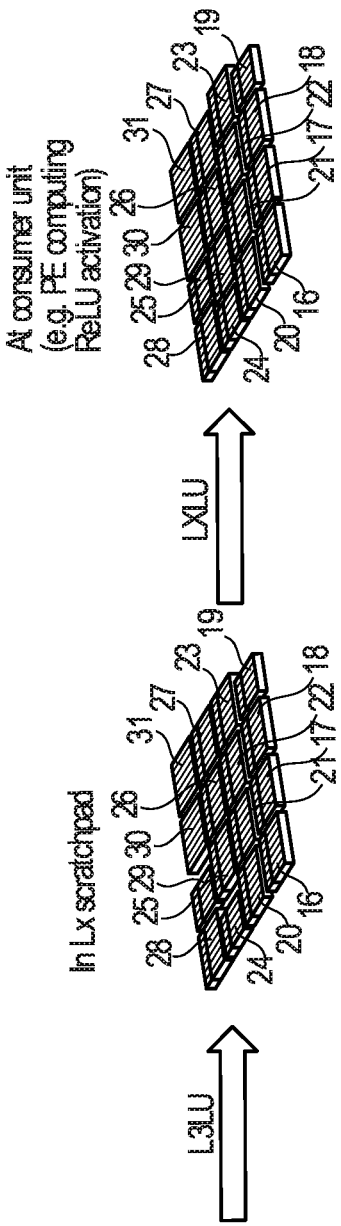
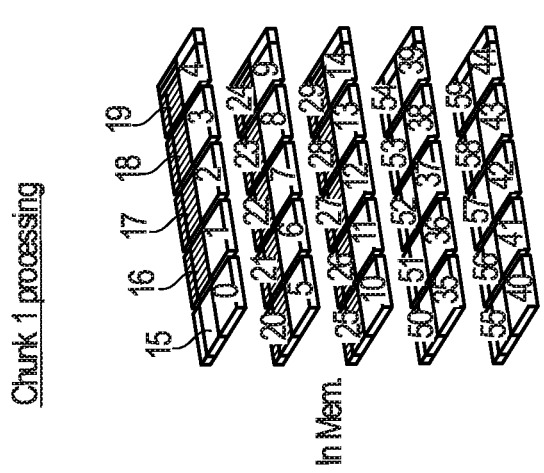
Fig. 4D
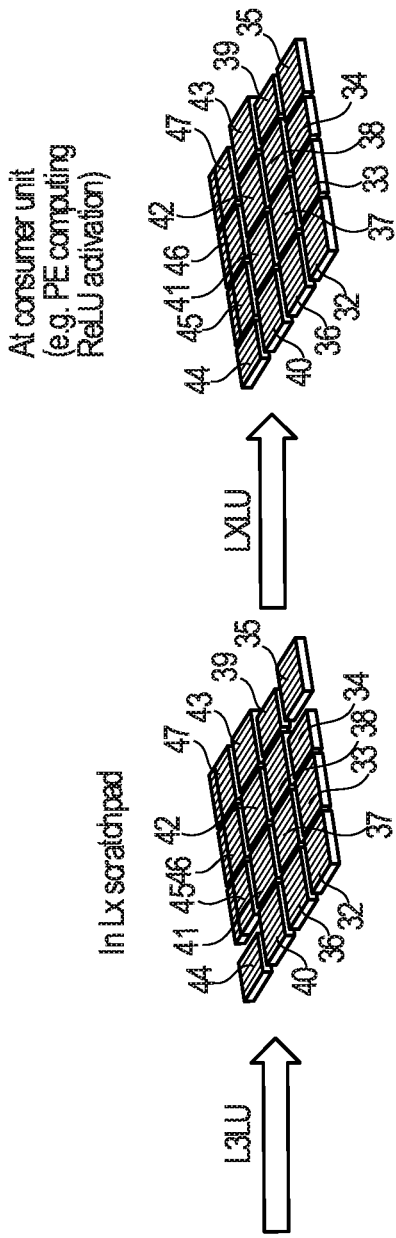
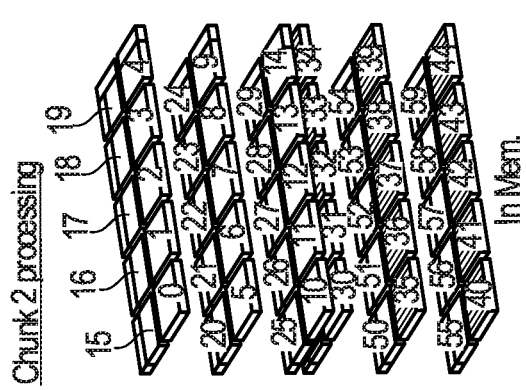
Fig. 4E

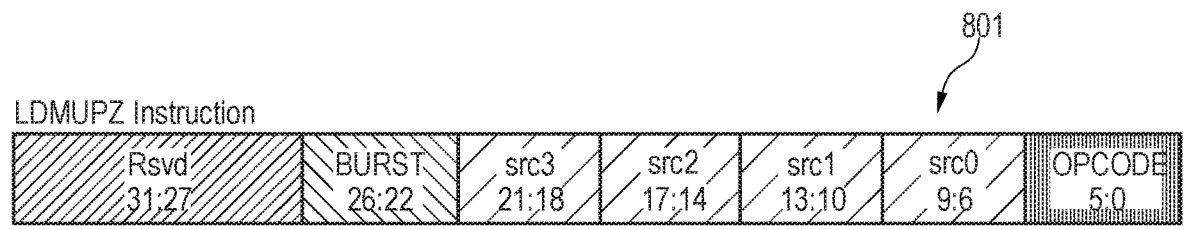
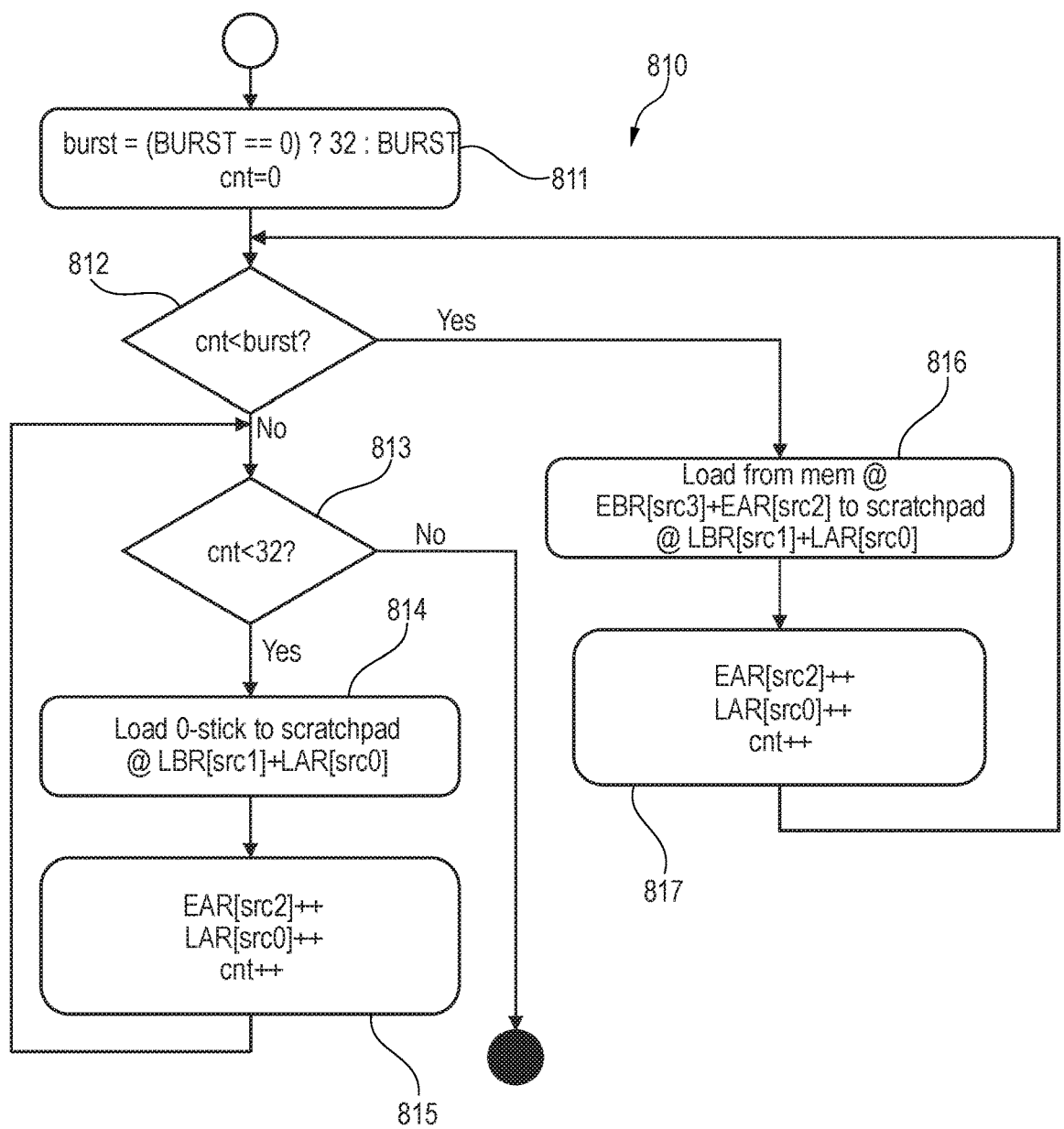
Fig. 8

1001

```
N, C, H, W       = 2, 120, 3, 150
QN, QC, QH, QW   = 2,   2, 3,   5   // quantities of pages per dimension TOTAL_PG  = QN*QC*QH*QW = 60    // total pages
CHHUNKSZ_PG             = 16    // chunk size in pages
PARTIAL_BURST           = W % 32 // #sticks in a partial page // handling of full pages
chunk_pg_cnt = CHUNKSZ_PG        // initialize chunk page counter
full_pg_itc  = QW-1              // initialize full-page iteration counter for 1 to TOTAL_PG
{
  // handling of partial vs. full  pages
  if full_pg_itc < 1
  {
    LDMUPZ (burst=PARTIAL_BURST, EAR++32)
    full_page_itc = QW   // reset full-page iteration counter
  } else {
    LDMU (burst=32, EAR++32) // load full page and post-increment
  }
  full_page_itc = full_page_itc - 1// count down full pages in an iter.

// handling of chunking
  if chunk_pg_cnt <= 1
  {
    SYNC // terminate a full chunk
    chunk_pg_cnt = CHUNKSZ_PG + 1 // reset chunk page counter
  }
  chunk_pg_cnt = chunk_pg_cnt - 1 // count down pages in a chunk }
// force termination if last chunk was only partially utilized
if chunk_pg_cnt < 16
{
  SYNC // terminate partial chunk
}
```

Fig. 10

```
// Program starts here:
0:  L3LUJIMMCOPY (jcr_tgt=0, imm=chunksz_pg) // initialize chunk page counter in JCR[0]
1:  L3LUJIMMCOPY (jcr_tgt=1, imm=W_FULL_PG) // initialize full-page iteration counter in JCR[1]
2:  L3LUMMLOOPCNT (imm=1) // Dummy loop to misuse lccr as constant to compare a JCR against.
                          // In all the JCMP we will compare JCR against this lccr
                          // to decide whether to branch or not.

3:  L3LUMMLOOPCNT (imm=TOTAL_PG)  // loop for all pages
    {
//// Handling of partial vs. full pages starts here /////////
4:      L3LUJCMP (pc_tgt=8, isimm=0, jcr=1, mode=0b110, lccr=0)  // if (JCR[1]<1) then load
                                                                // partial pages ....
5:      L3LULDMUP (lebe=0b101, burst=PARTIAL_BURST, ebr=0, ear=0, lbr=0, lar=0)
6:      L3LUJIMMCOPY (jcr_tgt=1, imm=W_FULL_PG+1)  // reset JCR[1] (full-page itc)
7:      L3LUJCMP (pc_tgt=9, isimm=0, jcr=1, mode=0b000, lccr=0)  // jump to end of if-else
    //else load full pages
8:      L3LULDMU (lebe=0b101, burst=32, ebr=0, ear=0, lbr=0, lar=0)  // load full burst
9:      L3LUJADD (jcr_tgt=1, imm=1, src0=1)  // decrement JCR[1] (full-page iteration counter)
///////////////////////////////////////////////////////////
::
17:     L3LU.RETURN ()  // end program
    }
```

Fig. 10 (cont)

PROCESSING TENSORS

BACKGROUND

The present disclosure relates to the field of digital computer systems, and more specifically, to a method for accessing tensors.

Tensor-based methods are gaining increasing interest in the machine learning field. A tensor can be seen as a generalization of multidimensional arrays where the traditional algebraic operators are extended. Accordingly, there is a continuous need for improved handling and processing of tensors.

SUMMARY

Various embodiments provide a method, computer program product, and computer system for accessing tensors. Embodiments of the present disclosure can be freely combined with each other if they are not mutually exclusive. For example, aspects of the disclosure relate to a method of accessing a n-dimensional tensor of elements in a memory by a computer system, the multidimensional tensor comprising two-dimensional arrays, herein referred to as pages, each page being configured to comprise a predefined number of one-dimensional arrays of elements, herein referred to as sticks. The method further includes linearly loading page per page of the tensor, and doing the following for each page: loading the non-empty sticks of the page from the memory using a base address of the page and determining a base address for the subsequent page using the number of loaded sticks and using an address offset indicative of potential empty sticks of the page. In case the number of loaded pages reaches a chunk size, the chunk page counter may be reinitialized and the linear loading may be continued with a subsequent page. Some aspects of the disclosure relate to a computer program product comprising a computer-readable storage medium having computer-readable program code embodied therewith, the computer-readable program code configured to implement the method of the above embodiment.

A system and computer program configured to execute the aspects of the method described above are also described herein. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 4A-E illustrate access patterns across a stickified 4D tensor that is further partitioned into chunks.

FIG. 8 shows the format and function of the LDMUPZ instruction.

FIG. 10 shows two listings of an example pseudo-code and a machine-code of an example implementation of the present subject matter.

DETAILED DESCRIPTION

Figure 1:
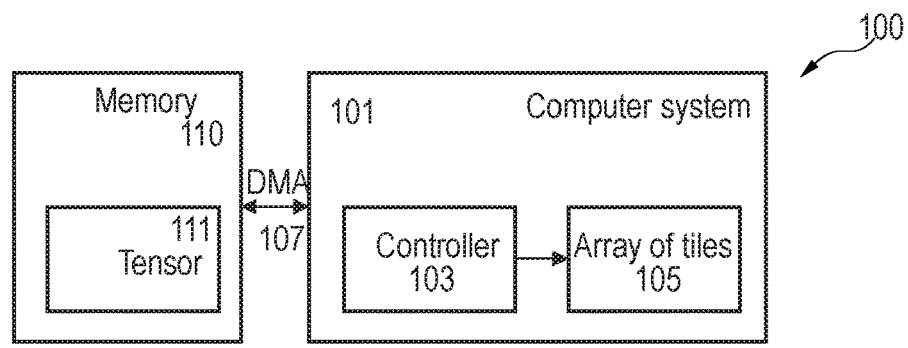
FIG. 1 is a diagram illustrating a tensor processing system according to an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

A tensor $T_o$ may represent a n-way data array, $T_o \in \mathbb{R}^{k_1 \times k_2 \times \ldots \times k_n}$. The integer n may be referred to as the order or rank of the tensor and it represents the number of dimensions or axes of the tensor. $k_1, k_2, \ldots, k_n$ represent the length (number of items) of each of the axes of the tensor $T_o$ respectively. The size of the tensor may be the total number $k_1 \times k_2 \times \ldots \times k_n$ of items in the tensor $T_o$. The item of the tensor $T_o$ may be a data element such as a weight or pixel value. However, the size of the tensor may grow very fast as the order n of the tensor increases. Aspects of the present disclosure may improve the ability of conventional solutions to handle the growing size of such tensors by representing the tensor $T_o$, which may be referred to as the original tensor, by another tensor $T_r$ having a smaller number of processable units (pages) that may be optimized for data processing. This may enable solving high-dimensional problems with an optimized computational cost. For that, the original tensor $T_o$ may be restructured into quantities of pages per dimension. Each page may comprise a predefined number $N_s$ of sticks. Each stick may comprise a predefined number $N_e$ of items of the original tensor $T_o$. The items of the new tensor $T_r$ may be the pages instead of the data elements of the original tensor $T_o$. Thus, the tensor $T_r$ may represent a n-way data array e.g., $T_r \in \mathbb{R}^{m_1 \times m_2 \times \ldots \times m_n}$, where $m_1, m_2, \ldots, m_n$ represent the length (e.g., number of pages) of each of the axes of the tensor $T_r$ respectively.

Aspects of the present disclosure may optimize the number $N_e$ of items in a stick and the number $N_s$ of sticks in a page based on available resources at the computer system. For example, multiple data elements may be grouped and aligned in a stick to satisfy an inherent requirement of a data structure of the memory system (e.g., where the requirement is the size of cache lines). For another example, multiple data elements may be grouped and aligned in a stick to satisfy a particular width of data busses to the computer system. For yet another example, multiple data elements may be grouped and aligned in a stick to satisfy a particular requirement of parallel processing units of the computer system (e.g., number of single instructions multiple data (SIMD) slots, size of compute array, etc.). A stick may correspond to the width of the data bus and/or the effective SIMD width, e.g., a stick may have 64 elements×2 bytes/element. And a page may be quantized to a number of sticks that corresponds to a burst size, based on the loading capability of the computer system.

The restructuring of the original tensor may result in empty elements in sticks and may result in partial pages. In particular, since a stick as discussed as being generated herein has $N_e$ elements, the new tensor $T_r$ may contain empty elements at the edges, depending on the original tensor sizes. Partial sticks due to fractional quantities may, for example, be padded. In addition, due to fractional quantities, the new tensor $T_r$ may contain also partial pages at the edges that may be partially unutilized. Due to the presence of empty elements, the processing order of pages in the new tensor $T_r$ may not be the same as the processing order of data elements in the original tensor $T_o$. In particular, the order of dimensions may be altered to match an optimal processing order of the computer system. The storage order of the new tensor $T_r$ may be different from the storage order of the original tensor $T_o$. The storage order may be an order of dimensions of the tensor.

The restructuring and change in storage order may lead to a situation where multidimensional tensors of actual data elements are hierarchically partitioned in memory, whereby the partition layers can be un-correlated to each other and thus lead to irregular patterns that vary from problem to problem. Accessing such chunks of data in a (contiguous) linear fashion with spatial data locality across the complex multiple un-correlated layers of data organisation may lead problems in conventional systems, where these problems are address and/or solved by aspects of the present disclosure. For example, aspects of the present disclosure may enable a linear access and computation of data in a n-dimensional tensor that is hierarchically organized in chunks of pages of sticks of data elements, where n is an integer. The n-dimensional tensor may be referred to as a multidimensional tensor. Hierarchically organizing the n-dimensional tensor as discussed herein may allow linear traversal by a single loop which is fused over pagewise-partitioned quantities. Full pages are loaded with a fixed burst size of $N_s$ sticks of $N_e$ elements each. Partial pages at the edge are only partially loaded/computed and the missing sticks skipped. Special handling at the end of a chunk may be enabled in order to signalize end of phase.

Similarly, an ability to load pages as is currently available by conventional means may be improved by aspects of the present disclosure controlling the definition of the chunk size based on the configuration of the computer system or other limitations. For example, the size of data chunks can be limited by an expected response time of the accelerator that needs to be guaranteed in the system. This may particularly be advantageous for multithreading and reliability, availability and serviceability (RAS) aspects.

In one example implementation (referred to herein as image use case), the n-dimensional tensor may represent image data, wherein n=4 (4D tensor). The four dimensions may represent the number N of images in the batch, the height H of the image, the width W of the image and the number C of channels of the image. The original tensor $T_o$ may have the storage order NHWC (for simplification of the description, the dimensions of the original tensor may be referred to with an index 'o' as follows: No, Ho, Wo and Co) and the new tensor $T_r$ may have the storage order NCHW. The method may enable a linear access and computation of data in a 4-dimensional tensor that is hierarchically organized in chunks of pages of sticks of data elements. This may allow linear traversal by a single loop which is fused over pagewise-partitioned quantities in NCHW dimensions. Partial sticks (due to fractional quantities in e.g., C dimension) may be padded and fully computed. Full pages may be loaded with a fixed burst size of e.g., 32 sticks of 64 elements each (=4096 bytes). Partial pages at the edge (due to fractional quantities in e.g., W dimension) may only be partially loaded and/or computed and the missing sticks skipped by performing the following steps: loading only Wo % 32 sticks of the partial page, filling remaining 32−(Wo %32) sticks with zeros in the scratchpad (which may be needed for parallelization and block processing) and compensating address gap for next page by adding an offset of 32−(Wo %32).

According to one embodiment, the n-dimensional tensor is restructured into quantities of pages per dimension, such that per dimension i there is a predefined number $m_i$ of the pages. The method further comprises: determining a reading direction according to a predefined order of the n dimensions; initializing a second counter indicating a number of loaded full pages along the dimension with potentially partial pages, wherein loading the full page further comprises adjusting the second counter to indicate the number of loaded full pages; wherein loading of a potentially partial page further comprises reinitializing the second counter; wherein determining whether the page is a full page comprises determining whether the second counter exceeds a second constant value. The predefined order may be the storage order of the n-dimensional tensor, wherein the last ordered dimension may be the dimension with potentially partial pages. This embodiment may enable to use a single loop that is fused over the dimensions.

In the image use case, n=4, the dimension i=1 representing the number of images may comprise $m_1$ images, the dimension i=2 representing the number of channels of the image may comprise $m_2(=C)$ pages, the dimension i=3 representing the height of the image may comprise $m_3(=H)$ pages and the dimension i=4 representing the width of the image may comprise $m_4(=W)$ pages. The reading direction may, for example, be defined according to the storage order NCHW so that the image to be processed may first be indexed, followed by indexing the channel to be considered in that image, followed by indexing the height and then indexing the pages along the width. This may enable to use a single loop that is fused over N*C*H*W. For example, after loading every $m_4$−1 full pages, the next page may always be treated/loaded as a partial page. And after every 16 pages, the chunk may be terminated and end of (super-) phase may be signalized to e.g., firmware or the main program on a different compute unit in the system, where 16 is an example value of the chunk size.

According to one embodiment, the method is a hardware implemented method and the computer system is an artificial intelligence (AI) accelerator, wherein the partial loading of the page comprises storing the partially loaded page in a memory of the accelerator and filling up the loaded page with sticks of dummy values so that the page becomes full page. The memory of the AI accelerator may be a scratchpad memory. The scratchpad memory may be used as on-chip storage.

According to some embodiments, the dummy values are provided such that the processing of the dummy values by the accelerator does not generate an exception error and/or does not affect the result of the processing of the tensor data.

According to some embodiments, the method further comprises initializing a second counter indicating a number of loaded full pages, wherein loading the full page further comprises adjusting the second counter to indicate the number of loaded full pages; wherein loading of the partial page further comprises reinitializing the second counter; wherein determining whether the page is a full page comprises determining whether the second counter exceeds a second constant value. According to some embodiments, the method comprises initializing the second counter with the number of full pages $m_{r1}-1$, where r1 is a selected dimension with potentially partial pages, wherein adjusting the second counter comprises decrementing the second counter, wherein the second constant value is zero or one. In an alternative embodiment, the second counter may be used as an up-wards counter which may be initialized to zero or one and incremented until it reaches the second constant value, wherein the second constant value may be equal to: $m_{r1}-1$. In the image use case, the dimension r1 is the dimension that corresponds to the width of the image.

According to one embodiment, the computer system is an artificial intelligence accelerator comprising a first set of registers and a second set of registers such that a register of the second set of registers is assigned to a respective loop in a machine code being executed by the accelerator in order to store a value indicating a current number of iterations of the loop. The accelerator further comprises loop count compare logic that is configured to compare a content of a register of the first set of registers and another register of the second set of registers in response to receiving a comparison machine instruction indicating these two registers. The loop count compare logic is further configured to jump to a specific machine instruction based on the comparison result.

Aspects of the disclosure are further configured to store the first counter in a first register of the first set of registers for the initialization of the first counter. Further, executing the first loop includes performing the linear loading. Executing the first loop further includes adding in the machine code a dummy iteration loop which is an outer loop of the first loop such that a register of the second set of registers, herein referred to as chunk register, is assigned with the dummy iteration loop, thereby enabling the chunk register to store the first constant value. Pre-emptively leaving the dummy iteration loop at the end of the loop body results in the dummy iteration loop body being executed only once (e.g., such that it can't/won't be executed more than once. Determining whether the number of loaded pages reaches the chunk size includes executing the comparison instruction indicating the first register and the chunk register.

This embodiment may be advantageous for the following reasons. In case of AI accelerators, the hardware implementation of the present method may be challenging. A first challenge may be chunking (i.e., phase handling) because it is not correlated to tensor dimensions (assuming fixed chunk size). To solve this issue, aspects of this disclosure include the provision of counters and dynamic program flow (if-else) to handle phase-ends irrespective of current loop count by jumping to another code block if certain counter value reached (e.g., if partial page is reached or end of chunk). A second challenge with the AI accelerator may be that a comparison of a control-related counter against a constant value may not be possible due to the limitation in the hardware. For that, the present subject matter may utilize a loop manager of the AI accelerator and use a most-outer dummy loop to hide a constant value in a loop count control register (LCCR), use a jump compare register (JCR) to count pages, compare the JCR against the hidden constant value in LCCR0, and jump to another code block that does the special treatment. The second set of registers may be the LCCR and the first set of registers may be the JCR. The dummy loop may be configured to be set to the first constant value which is stored in the LCCR and such that it pre-emptively leaves at the end of the loop body so that the dummy iteration loop body is not executed more than once.

According to some embodiments, the computer system includes an artificial intelligence accelerator comprising a first set of registers and a second set of registers such that a register of the second set of registers is assigned to a respective loop in a machine code being executed by the accelerator in order to store a value indicating a current number of iterations of the loop. The accelerator further comprises the loop count compare logic described that is configured to compare content of the two registers (in response to receiving a comparison instruction indicating these two registers) and to jump to a specific instruction based on the comparison result, storing the first and second counter in two registers of the first set of registers for the initialization of the first counter and of the second register, and executing the first loop instructions as detailed above.

According to some embodiments, the accelerator further executes the partial loading of the page. In certain examples, the accelerator executes this partial loading of the page (and/or other/all operations described herein) via a "machine instruction," which includes a command or program written in machine code of a machine (e.g., computer) that the accelerator can recognize and execute. As a result of the accelerator executing these operations as a result of these machine instructions (e.g., where these machine instructions may be discrete, stand-alone executables), aspects of this disclosure may reduce or eliminate the issue of filling up remaining sticks with zeros as it may cost synchronization time when done by separate instructions (e.g., LDZ instructions). The single machine instruction, which may be named LDMUPZ instruction, may load bursts e.g., of up to 32 sticks, from the memory, with autoincrement while filling up partial pages with zero-sticks to be always full pages in the scratchpad. Alternatively, the single machine instruction, which may be named LDMUP instruction, is like LDMUPZ but fills up partial pages with value specified in a register.

According to some embodiments, aspects of this disclosure are configured to initialize the first counter with the chunk size, wherein adjusting the first counter comprises decrementing the first counter, wherein the first constant value is zero or one. Alternatively, the first counter may be an up-wards counter which may be initialized with zero or one and incremented until it reaches the chunk size.

FIG. 1 illustrates an example of a tensor processing system according to examples of the present subject matter. The tensor processing system 100 comprises a computer system 101. The computer system 101 may, for example, be an integrated circuit. In one example, the computer system 101 may be an artificial intelligence accelerator that co-exists in the tensor processing system 100 along with a processor (not shown), either being integrated on the same chip or attached to the processor by external Input/Output (I/O) interfaces or remotely in a cloud environment.

The computer system 101 comprises a controller 103 and a processing engine array 105 of tiles. Input data may be loaded over an interconnect 107. The interconnect 107 may connect the computer system 101 to other components such as a Direct Memory Access (DMA) engine that can obtain input data 111 from an external memory 110 such as an Input/Output (I/O) device or a storage drive. The input data 111 may, for example, be one or more portions of an image. The one or more portions may be stacked in a depth-wise fashion to form a n-dimensional tensor.

When in operation (e.g., when computing a result for a set of input data), the input data 111 may be loaded into a local memory (e.g., scratchpad, distributed registers, block RAMs, etc.) of the computer system 101, and the processing engine array 105 may read data values from the local memory. The processing engine array 105 may output computation results e.g., to the memory 110. The computer system 101 may have self-directed access to main memory 110 or a portion of it by e.g., DMA, transport chunks of data to the local memory for computation and send results back to the main memory.

Figure 2A:
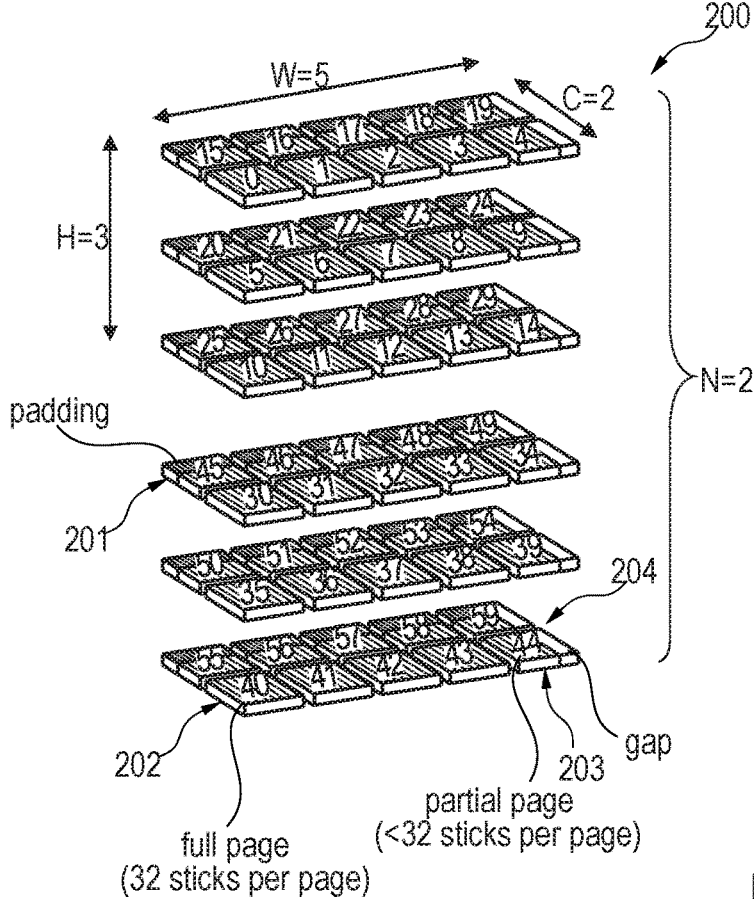
FIG. 2A is a diagram illustrating a structure of a n-dimensional tensor in accordance with an example of the present subject matter.

FIG. 2A illustrates an example format that the input data 111 may take in some embodiments. The input data 111 may, for example, be image data. The input data 111 may comprise values such as pixel values. For example, each value in the input data 111 may be associated with coordinates indicating the position within a set of images. The input data 111 according to the present subject matter may be provided in the format of a n-dimensional tensor 200 comprising pages of sticks of data elements. A data element may, for example, be an image pixel value. Each page may comprise a predefined number of sticks $N_s$ e.g., $N_s$=32 sticks, and each stick may comprise a predefined number of elements $N_e$, e.g., $N_e$=64 elements. The page may be referred to as a full page if all sticks of the page have valid data (e.g., image data); otherwise, the page may be referred to as partial page. The n-dimensional tensor 200 may comprise a predefined number of pages along each dimension, wherein the predefined number of pages comprises zero or more partial pages. FIG. 2A shows the specific example of a hierarchical partition of a 4-dimensional tensor. In case of image data, the 4-dimensional tensor may have the NCHW format, where N is the number of images in the batch, H height of the image, W, width of the image, and C the number of channels of the image.

Figure 2B:
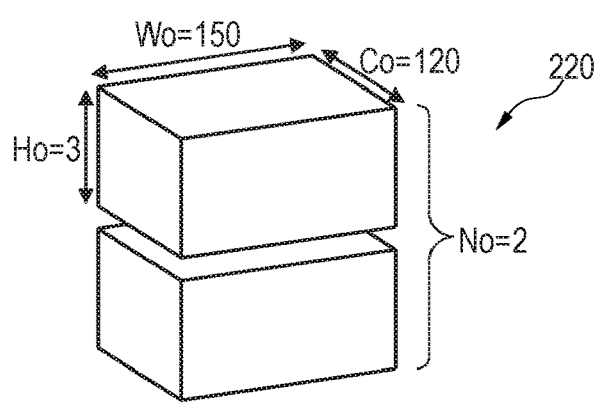
FIG. 2B is a diagram illustrating a structure of a n-dimensional tensor.

In one example, the n-dimensional tensor 200 of FIG. 2A may be obtained from an original tensor, such as the tensor 220 shown in FIG. 2B. The original tensor 220 may have the NHWC format. The original tensor 220 may get restructured into quantities of pages per dimension. Thereby the order of dimensions can be altered (e.g., NHWC→NCHW) to match the processing order of the accelerator. As an example, an original tensor 220 with the dimensions No×Ho×Wo× Co=2×3×150×120 elements gets restructured into a "stickified" and hierarchically partitioned tensor 200 of N×H×W× C=2×3×5×2 pages of 32 sticks of 64 elements. A stick may correspond to the width of the data bus and/or the effective SIMD width, e.g., here 64 elements×2 bytes/element. Since a stick is quantized to 64 elements, the new structure may contain empty elements at the edges, depending on the original tensor sizes. Aspects of the disclosure pad these partial sticks 201 to "fill them out." A page is quantized to 32 sticks. The majority of pages are full pages 202, i.e., they are fully utilized with valid elements. Due to fractional quantities, the new structure may contain partial pages 203 at the edges that are not fully utilized. In that case, only the utilized sticks may be loaded. This leads to address gaps 204 at the edges that need to be compensated for a streaming of data.

Figure 3:
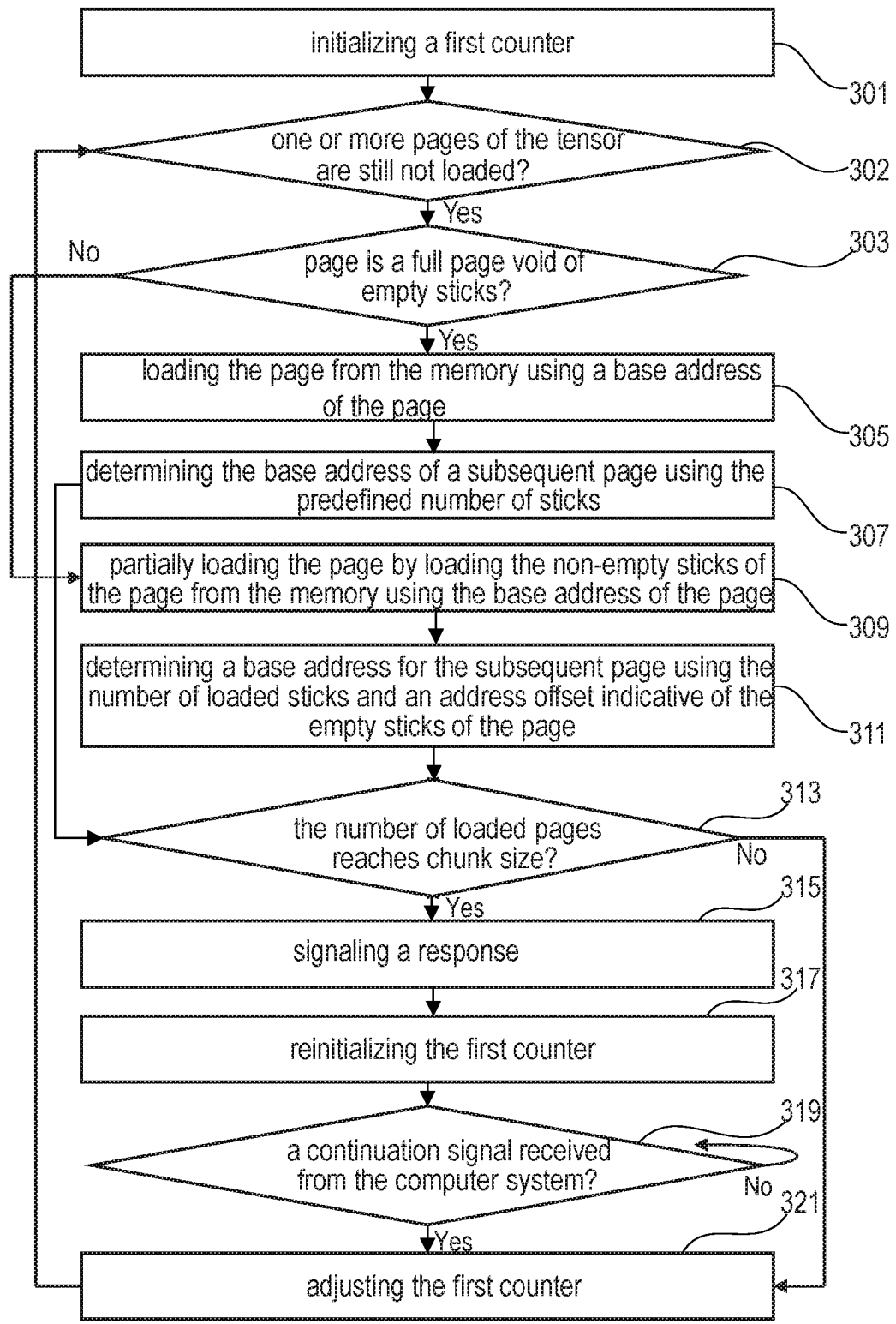
FIG. 3 is a flowchart of a method for accessing a n-dimensional tensor in accordance with an example of the present subject matter.

FIG. 3 is a flowchart of a method for accessing a n-dimensional tensor of elements in a memory by a computer system in accordance with an example of the present subject matter. For the purpose of explanation, the method described in FIG. 3 may be implemented in the computer system 101 of FIG. 1 using the n-dimensional tensor 200 of FIG. 2A, though the flowchart of FIG. 3 may be implemented by other computer systems using other tensors in other embodiments.

A first counter may be initialized in step 301 with an initial value. For example, the first counter may be initialized with a predefined chunk size, zero, or one (such that the initial value may be the chunk size, zero, or one). The chunk size may, for example, be a number of pages that can be processed by the computer system 101 within an acceptable response time of the computer system 101 (e.g., a response time that is predetermined to be achievable and repeatable and acceptable by the computer system 101). Alternatively, the chunk size may be determined based on other limitations such as the local memory, pricing model (e.g., $0.01 per processed chunk in an AI as a service business model), or the like.

The pages of the n-dimensional tensor 200 may be linearly loaded page by page as described with the steps 302 to 321. If (step 302) there is a page that is not yet loaded, it may be determined in step 303 whether the page is a full page which is void of empty sticks. In response to determining that the page 202 is a full page, the page may be loaded in step 305 from the memory 110 using a base address of the page. The base address of a subsequent page may be determined in step 307 using the predefined number of sticks.

In response to determining that the page is not a full page, the page may be partially loaded in step 309 by loading the non-empty sticks of the page from the memory 110 using the base address of the page. A base address for the subsequent page may be determined in step 311 using the number of loaded sticks and an address offset indicative of the empty sticks of the page.

It may be determined in step 313 whether the number of loaded pages reaches the chunk size by comparing the first counter with a first constant value. The first constant value may be provided based on how the first counter is initialized. For example, if the first counter is initialized with the chunk size, the first constant value may be zero or one. If the first counter is initialized with zero, the first constant value may be the chunk size.

In response to determining that the chunk size is reached, a response may be signalled in step 315 to the computer system 101 or to the tensor processing system 100. For example, the response may be signalled to a firmware or a main program in the tensor processing system 100 that manages the execution of processes including the process of the present method. The first counter may be reinitialized in step 317 with a value derived from the initial value. For example, the first counter may be reinitialized with the chunk size plus one or with zero minus one. This modified initialization is due to hardware limitations that requires the adjustment of the first counter right after it has been reinitialized. In particular, the computer system may comprise a main code block logic for executing steps 302 to 313 followed by step 321, and a separate code block logic to which one jump/branch to execute steps 315 to 319 before jumping back to the main block to continue with execution of step 321.

As indicated in FIG. 3, upon receiving (e.g., in step 319) a continuation signal from the computer system 101 or from the tensor processing system 100, the first counter may be adjusted in step 321 and the linear loading with a subsequent page may be continued. The step 315 of signalling the response and step 319 may be steps of a handshaking process that enables the system to continue with the next step 321.

In response to determining that the chunk size is not reached, the first counter may be adjusted in step 321 and the linear loading may be continued with a subsequent page. Depending on how the first counter is initialized, the first counter may be incremented or decremented. For example, if the first counter is initialized with the chunk size, it may be decremented in step 321 and if it is initialized with zero it may be incremented in step 321. As indicated in FIG. 3, the steps 302 to 321 are repeatedly performed until all pages are loaded.

Figure 4C:
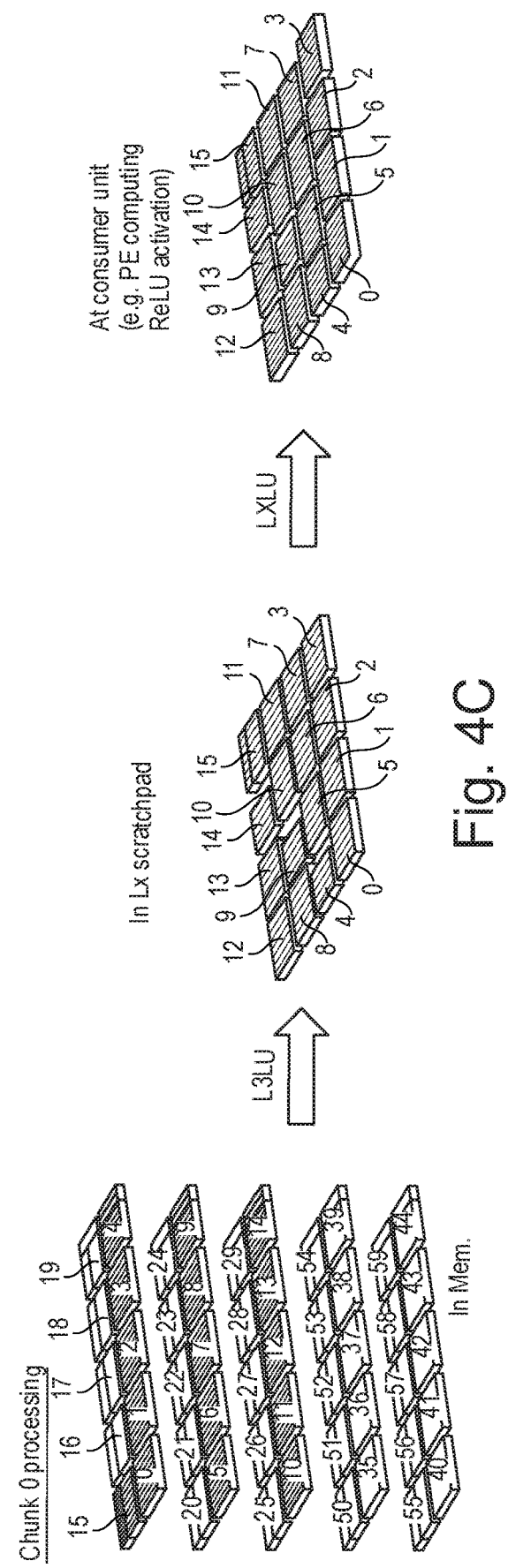

FIGS. 4A-E illustrate access patterns across a stickified 4D tensor 401 that is further partitioned into chunks. As shown in FIG. 4A, in the 4D tensor 401 each chunk of 16 pages has a different fill pattern to illustrate the partitioning. The size of a particular chunk (here 16 pages) may be chosen such that the time that it will take to process that particular chunk is within the limits of the expected response time of the accelerator. As can be seen, the chunks may not correlate to the tensor dimensions (e.g., such that the filling pattern do not have to obey any boundaries of the tensors), but are instead somewhat irregular. The meander-shaped line 402 as well as the page numbers depict an order in which the pages are loaded and/or processed. The timeline 405 shows a page access pattern based on full and partial pages. Repeatedly W−1 contiguous full pages followed by one partial page are loaded and/or processed. Since this access pattern and the chunking are uncorrelated, simple for-loops alone may be insufficient. Accordingly, aspects of this disclosure relate to using a dynamic program flow.

FIGS. 4C-E illustrate the processing of the first, second and third chunks of the 4D tensor 401 respectively. As shown in FIG. 4C, the first chunk of 16 pages may be loaded in a scratchpad memory of the accelerator (e.g., using data mover engine L3LU) before being moved and/or streamed (e.g., using data mover engine LXLU) to the processing engine array. After completing the first chunk, the next chunk is processed as shown in FIG. 4D and so on until all chunks of the 4D tensor 401 are processed. The page numbering and the line 402 in FIG. 4A indicate the reading direction along which the pages are loaded. For example, starting from a first level of the dimension N, first level of dimension H and first level of dimension C, first W pages are loaded along the dimension representing W, and the next W pages are obtained by moving along the dimension H to the second level of H, and after processing the last level of dimension H, one move along dimension C and so on. This is indicated in FIG. 4A, after loading the first 15 pages one move along dimension C to page number 15 etc. After processing all pages of the current level of dimension N, one move to the next level N and so on.

Figure 5:
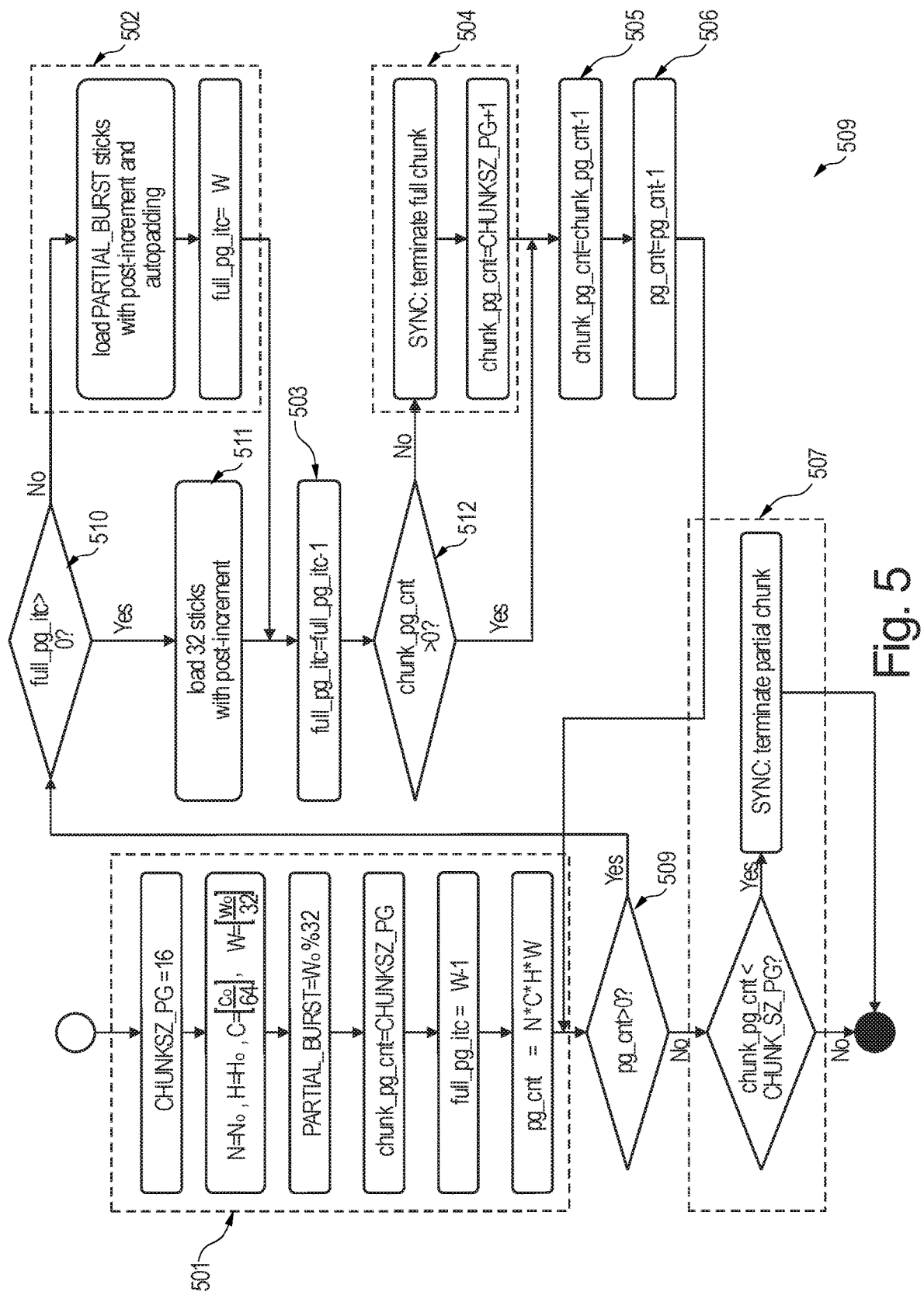
FIG. 5 is a flowchart of a method that realizes linear access patterns through uncorrelated hierarchically partitioned 4D tensors.

FIG. 5 shows a flowchart of a method that realizes linear access patterns through uncorrelated hierarchically partitioned 4D tensors. In some embodiments, a single loop fuses over N*H*W*C loops over all pages (as indicated with step 509). In the flowchart this is further indicated by the count-down counter (e.g., which may be named pg_cnt as discussed herein) which is initialized in the setup block 501 and adjusted in step 506. Block 501 further defines the chunk size (CHUNKSZ_PG=16), the partial burst (PARTIAL_BURST=Wo %32) and defines the new dimensions shown in FIG. 2A which may be obtained from dimensions of FIG. 2B. The dimensions of the original tensors may be indicated by an index o as follows: No, Ho, Co and Wo. Further, there are two uncorrelated counters (initialized in block 501), where as discussed herein the first of the two uncorrelated counters is named full_pg_itc (which is adjusted in step 503) and the second is named chunk_page_cnt (which is adjusted in step 505). These uncorrelated counters control the special handlings as defined in FIGS. 4A-E.

The counter full_page_itc 503 counts down the full pages in an iteration before a partial page appears according to the pattern depicted in timeline 405. Based on this count there is a special treatment of partial pages in block 502 when the counter value reaches 0 (step 510), which includes loading less than 32 sticks, compensating the address gap, and resetting the full_pg_itc counter. If the counter value did not reach 0 (step 510), the 32 sticks of the page may be loaded with autoincrement (step 511). The counter chunk_pg_cnt 505 counts down the pages in a chunk. Based (step 512) on this count, a chunk is terminated in block 504 when the counter value reaches 0, e.g., a response to the system is generated by a command (named SYNC command) indicating that a chunk of pages has been processed, and the counter chunk_pg_cnt is reset in block 504 for the next chunk. The SYNC command in block 504 may involve a handshaking in which the system may wait in block 504 for a signal to continue with block 505. It may happen that the last chunk is only partially utilized, which in that case would not be terminated by block 504 as the counter chunk_pg_cnt would be higher than zero (>0). Therefore block 507 at the end of the flowchart handles the termination of partial chunks e.g., by executing a command to terminate the partial chunk.

Figure 6:
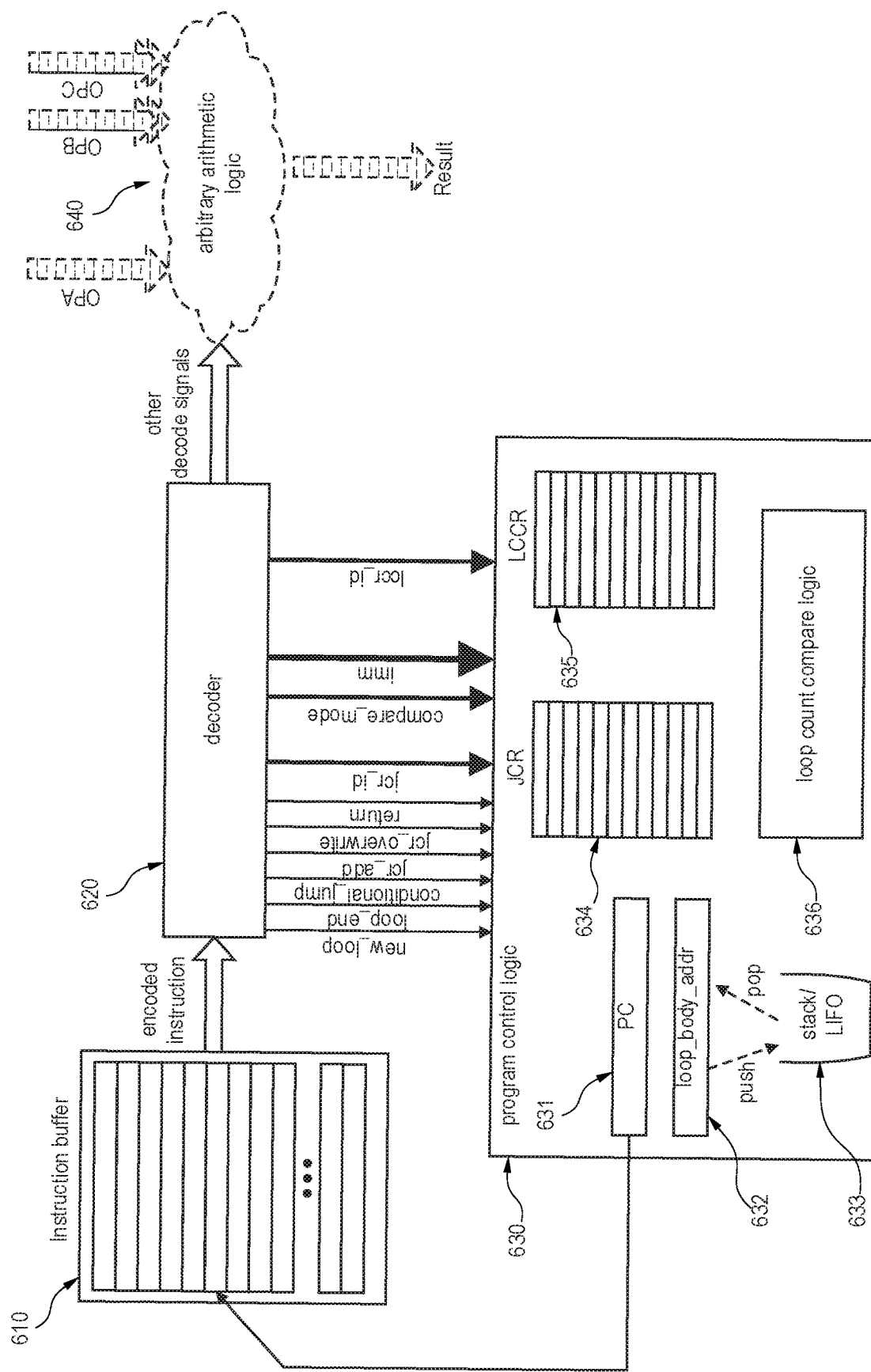
FIG. 6 shows a block diagram of an exemplary minimalistic control flow logic for accelerator tiles.

FIG. 6 shows a block diagram of minimalistic control flow logic for accelerator tiles, consisting of an instruction buffer 610, a decoder 620, program control logic 630 and arbitrary arithmetic logic 640. The instruction buffer 610, decoder 620, and program control logic 630 may form the controller 103 of FIG. 1, and the arbitrary arithmetic logic 640 may comprise the array of tiles 105 of FIG. 1. The instruction buffer 610 holds a program of instructions. One instruction at a time is read from the instruction buffer during execution and decoded by the decoder 620 generating control signals, such as instruction type (e.g., new_loop, loop_end, conditional_jump, jcr_add, jcr_overwrite, return, arithmetic instruction) and further instruction fields. The main purpose of the program control logic 630 is to control the sequence of instructions by modifying the program counter (PC) 631 that is used as read address or pointer in the instruction buffer. This may be done based on decoded signals from the decoder 620 and based on the inner state. To support nested loops, there may be a set of loop count control registers (LCCR) 635, one for each loop nest. The LCCR of an active loop-nest is initially set by a new_loop instruction and decremented with each iteration of the loop until a counter gets to 0, realizing for-loops. The loop_body_addr register 632 holds the address of the first instruction of an active loop. This may be the re-entry point after each iteration. The end of an iteration may be marked by a loop_end instruction. This could be a separate instruction or a flag in other instructions. A stack by the means of last-in-first-out (LIFO) memory may be used to store the loop_body_addr of a parent loop when entering a nested child loop and retrieve it when finishing the child loop. The loop count compare logic 636 may be used for conditional jump instructions allowing to jump to a specified PC target based on the comparison of the loop count of a specified nest level against a value stored in the jump compare register (JCR) set 634. JCR modifying instructions (e.g., jcr_overwrite, jcr_add) can be used to change the value of a JCR during runtime, making the comparator reference variable. The arbitrary arithmetic logic 640 can be a multiply-accumulate (MAC), a floating-point multiply-add (FMA) engine, or the like. The operational mode and operand selection may be controlled by signals from the instruction decoder 620.

Figure 7:
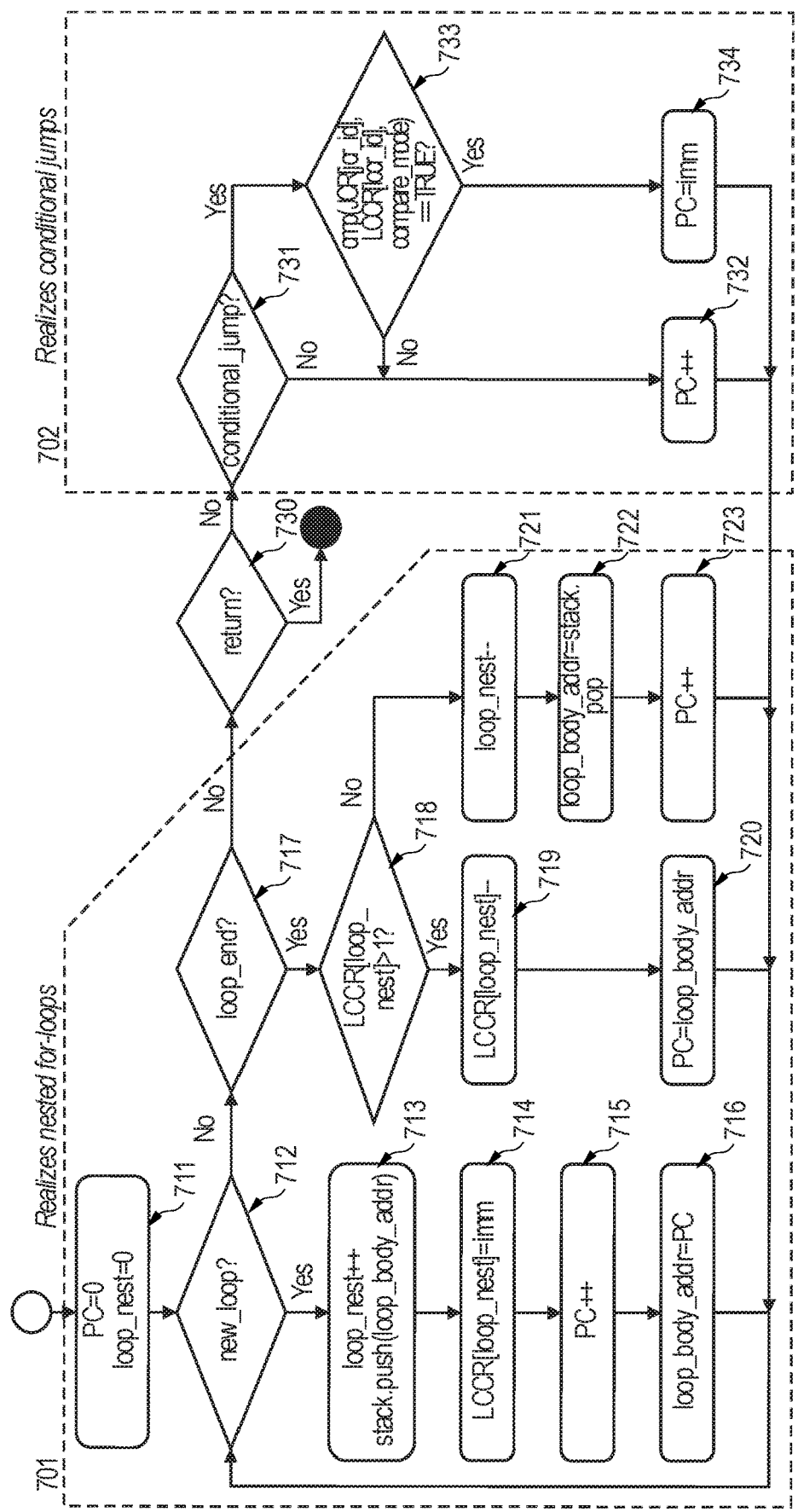
FIG. 7 is a flowchart describing the function of the program control logic.

FIG. 7 shows a flowchart describing the function of the program control logic 630. The marked area 701 describes the realization of nested for-loops. The PC and loop_nest indicators are initiated (711). When (712) the decoded instruction type is a new_loop instruction, the loop-nest level is incremented (713) and the LCCR of that particular loop-nest is set (714) to a value specified in the imm field of the instruction (this is how many times a loop body should loop). The old loop_body_addr may be pushed on the stack. It also increments (715) the PC, now pointing to the first instruction of the loop body. This may be stored (716) in the loop_body_addr. A loop_end instruction marks (717) the end of a loop body. If such an instruction is decoded, the value of the active LCCR may be checked (718) against 1 to determine whether there are more iterations to loop or the loop is finished. If LCCR[loop_nest]>1 there are more iterations to loop. Therefore, the loop count LCCR[loop_nest] may be decremented (719) and the PC may be set (720) to the value of loop_body_addr jumping back to the first instruction of the loop body. Otherwise, if LCCR [loop_nest] reached 1 all iterations are finished and an exit of the loop may be performed: the loop_nest may be decremented (721), the parent loop_body_addr may be restored (722) from the stack and the PC may be incremented (723) beyond the loop block continuing with the rest of the program. The marked area 702 describes the realization of conditional jump instruction, jumping to a PC target defined (734) in the imm field if the condition is met (731), otherwise incrementing (732) the PC. As it can be seen, the conditional jump depends on the comparison (733) of an LCCR against a JCR, i.e., is dependent on loop-count. The comparison mode may be specified in the compare_mode field of the jump_compare instruction (e.g., the comparison mode may be "greater than", "less than", "equal", "always true", etc.). The return instruction terminates the program, i.e., it stops the execution if (730) the return instruction is executed; otherwise, steps of block 702 may be executed. In other cases, the PC may be incremented.

FIG. 8 shows the format and function of the LDMUPZ instruction. The instruction format 801 consists of instruction fields for pointers src0, src1, src2, src3 to registers LAR, LBR, EAR, EBR containing address offset for local scratchpad, base address for local scratchpad, address offset for external memory and base address for external memory respectively. Furthermore, the instruction format 801 contains an instruction field for the burst length and an opcode field. The flowchart 810 in FIG. 8 describes the function of the LDMUPZ instruction. A burst length of 0 may be interpreted (811) as 32 (i.e., full page burst). Other burst lengths are interpreted as is. The actual burst length determines how many data sticks shall be loaded in a burst. A counter variable cnt may be used to count the sticks loaded. If (812) variable cnt is less than the actual burst length, and less than 32, then data sticks are loaded (816) from the memory at the address specified in the EBR[src3]+EAR[src2] registers to the local scratchpad at the address specified in the LBR[src1]+LAR[src0] registers. Thereby the respective LAR and EAR registers are automatically incremented (817) as well as the cnt variable. If cnt reached the actual burst length and is less (813) than 32, then 0-sticks are loaded (814) to the local scratchpad at the address specified in the LBR[src1]+LAR[src0] registers. Thereby the respective LAR and EAR registers are automatically incremented (815) as well as the cnt variable. The operation may be finished when variable cnt reached the value 32.

Figure 9:
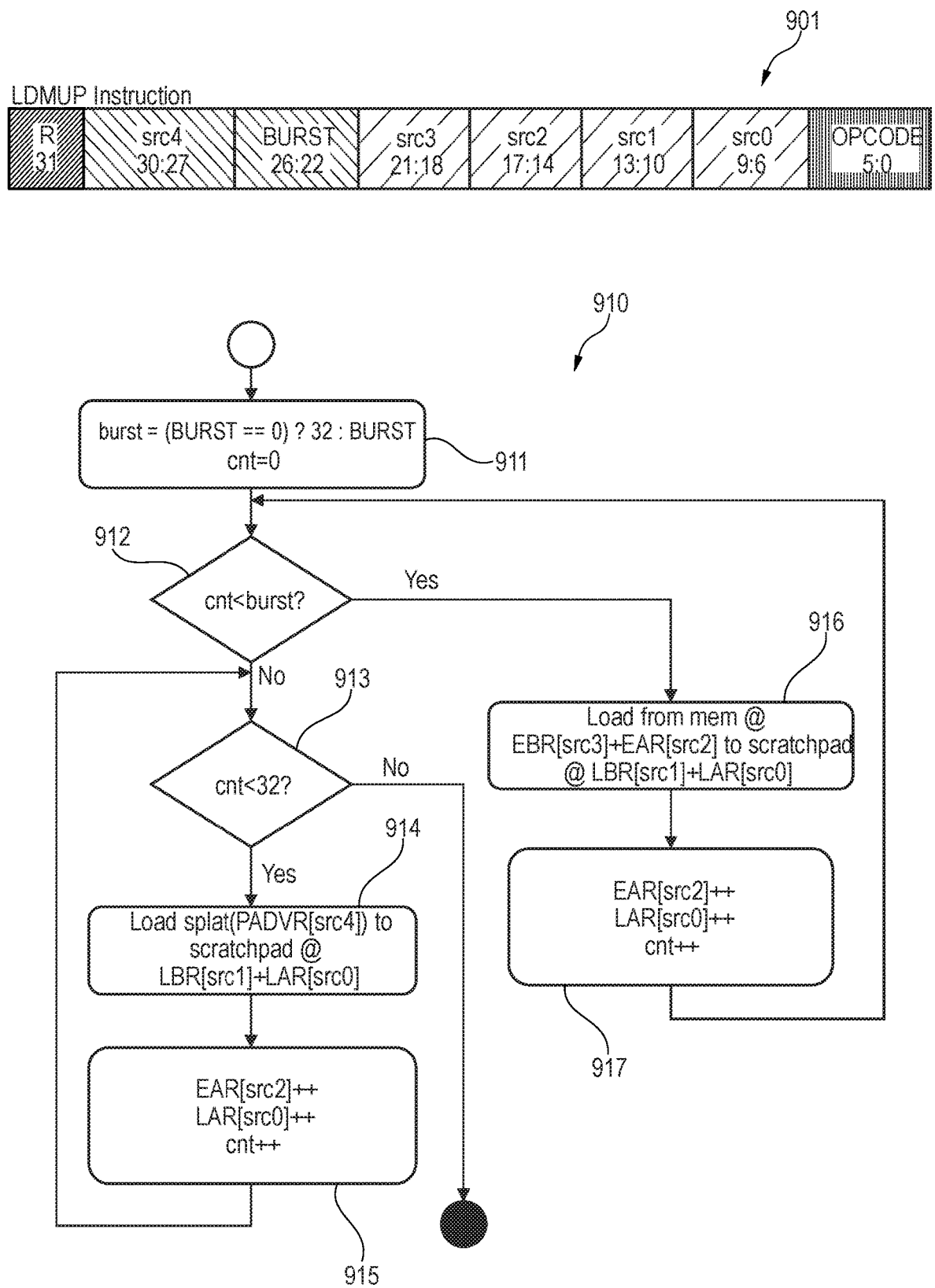
FIG. 9 shows the format and function of the LDMUP instruction.

FIG. 9 shows the format and function of the LDMUP instruction. The function may be similar to the LDMUPZ instruction, but pads missing sticks with a user-defined value in a pad value register. The instruction format 901 consists of instruction fields for pointers src0, src1, src2, src3 to registers LAR, LBR, EAR, EBR containing address offset for local scratchpad, base address for local scratchpad, address offset for external memory and bass address for external memory respectively. Furthermore, the instruction format contains an instruction field for the burst length and an opcode field. Furthermore, the instruction format contains an instruction field a pointer src4 to a pad value register PADVR. The flowchart 910 in FIG. 9 describes the function of the LDMUP instruction. A burst length of 0 is actually interpreted (911) as 32 (i.e., full page burst). Other burst lengths are interpreted as is. The actual burst length determines how many data sticks shall be loaded in a burst. A counter variable cnt may be used to count the sticks loaded. If (912) variable cnt is less than the actual burst length, and less than 32, then data sticks are loaded (916) from the memory at the address specified in the EBR[src3]+EAR[src2] registers to the local scratchpad at the address specified in the LBR[src1]+LAR[src0] registers. Thereby the respective LAR and EAR registers are automatically incremented (917) as well as the cnt variable. If cnt variable reached the actual burst length and is less (913) than 32, then a value in PADVR[src4] is used to form a stick which may be loaded (914) to the local scratchpad at the address specified in the LBR[src1]+LAR[src0] registers. Thereby the respective LAR and EAR registers are automatically incremented (915) as well as the cnt variable. The operation is finished when the variable cnt reached the value 32.

FIG. 10 shows two listings of a pseudo-code 1001 of the method of FIG. 5 and a machine-code 1002 that maps the method on the special ISA of the AI accelerator. As it can be seen in pseudo-code 1001, the method may use if-else like conditional branches with comparison of counter values against a constant. However, natively, the ISA of the AI accelerator may not support this directly. The present subject matter may solve this issue. In machine-code 1002, a method is presented that realizes this by utilizing the JCRs as counters and using a most outer dummy loop set to 1 in order to allow the available branching instruction JCMP to compare against a constant value (which may be the loop counter LCCR of the dummy loop). Since the dummy loop is over everything it may be quasi constant. JCMP can compare a JCR only against a loop counter, hence the dummy loop "hiding" a constant value in its LCCR and allowing the desired comparison. The AI accelerator may be configured to store in the LCCR the value (e.g., 1) to which a loop is set, but the AI accelerator is usually configured to decrement/increment the stored value in the LCCR after each iteration of the loop. The present subject matter may make use of this feature of the AI accelerator by creating the dummy loop in order to store a desired constant value. And in order to prevent the stored constant value from changing, the dummy loop may be pre-emptively left at the end of the loop body to avoid executing the dummy iteration loop body more than once.

Computing environment 1100 contains an example of an environment for the execution of at least some of the computer code involved in performing the inventive methods, such as tensor processing techniques 1199. In addition to tensor processing techniques 1199, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and tensor processing techniques 1199, as identified above), peripheral device set 1114 (including user interface (UI) device set 1123, storage 1124, and Internet of Things (IoT) sensor set 1125), and network module 1115. Remote server 104 includes remote database 1130. Public cloud 1105 includes gateway 1140, cloud orchestration module 1141, host physical machine set 1142, virtual machine set 1143, and container set 1144.

Figure 11:
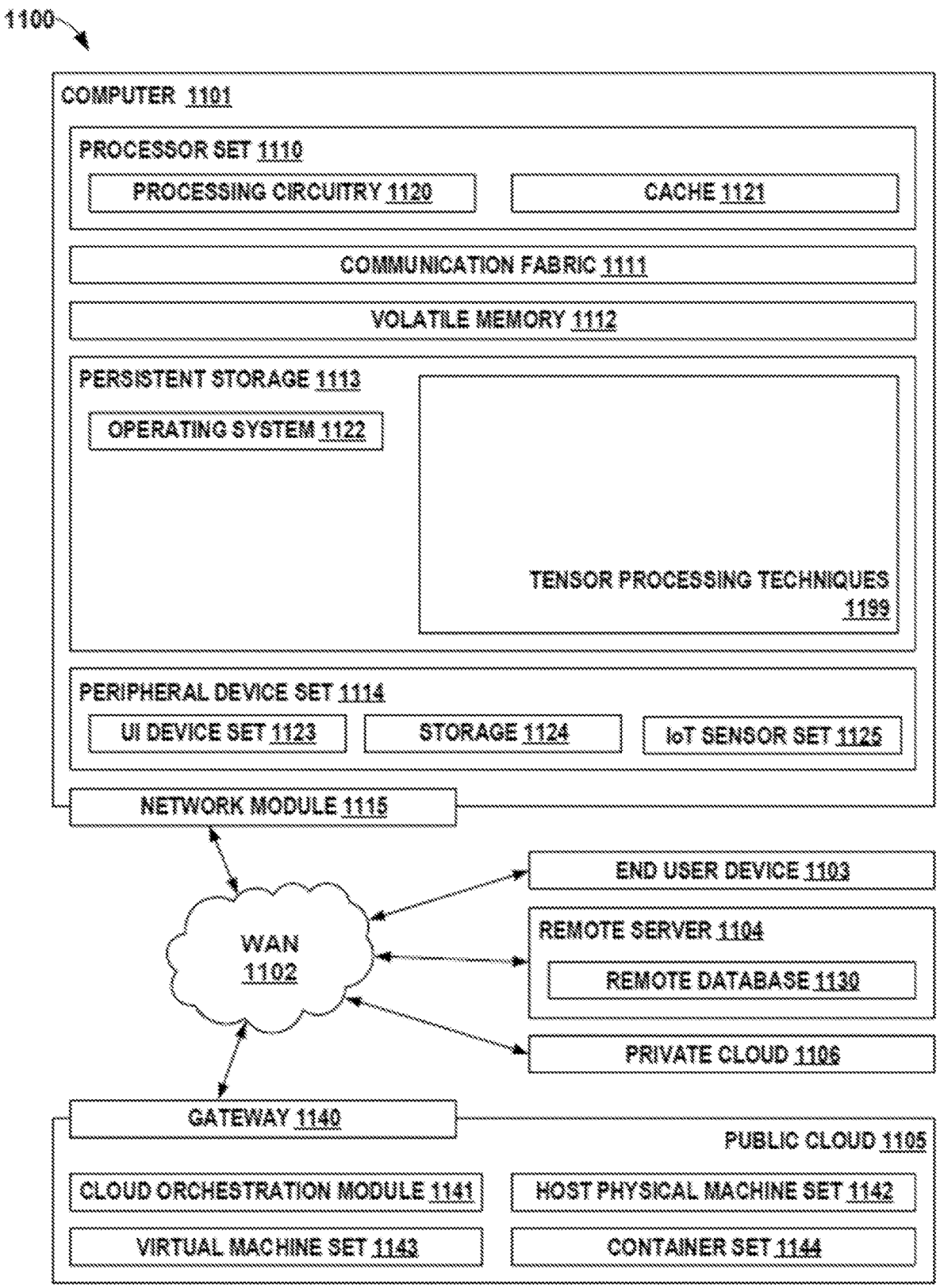
FIG. 11 depicts a conceptual box diagram of example components of a computing system that may be used to execute the flowcharts of FIG. 3, 5, or 7 as described herein.

Computer 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

Processor set 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in tensor processing techniques 1199 in persistent storage 1113.

Communication fabric 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

Persistent storage 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in tensor processing techniques 1199 typically includes at least some of the computer code involved in performing the inventive methods.

Peripheral device set 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

Network module 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

Remote server 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

Public cloud 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

Aspects of the present disclosure relate to a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method comprising:
   initializing a first counter with an initial value;
   linearly loading page per page of a n-dimensional tensor comprising a plurality of pages, wherein pages are two-dimensional arrays configured to comprise a predefined number of one-dimensional arrays of sticks, and n is an integer;
   determining that a first page of the plurality of pages is a full page;
   loading the first page from a memory using a base address of the first page and determining a respective base address of a first subsequent page using the predefined number of sticks in response to determining that the first page is a full page;
   determining that a second page of the plurality of pages is not a full page with only a number of loaded sticks;

partially loading the second page by:
  loading non-empty sticks of the second page from the memory using a respective base address of the second page;
  determining a respective base address for a second subsequent page using the number of loaded non-empty sticks and an address offset indicative of empty sticks of the second page;
  storing the partially loaded second page in a memory of an artificial intelligence (AI) accelerator; and
  filling up the partially loaded second page with sticks of dummy values so that the second page becomes a fully loaded second page, wherein the dummy values being provided are such that a processing of the dummy values by the AI accelerator does not generate an exception error or affect results of the processing;
  determining that a number of loaded pages reaches a chunk size by comparing the first counter with a first constant value;
  reinitializing the first counter with an adjusted initial value in response to determining that the number of loaded pages reaches the chunk size; and
  adjusting the first counter and continuing the linear loading with another subsequent page upon receiving a continuation signal.

2. The method of claim 1, wherein the n-dimensional tensor comprises n dimensions and per dimension i a predefined number m_i of the plurality of pages, and the method further comprises:
  determining a reading direction according to a predefined order of the n dimensions;
  initializing a second counter indicating a number of loaded full pages with partial pages, wherein loading each of the loaded full pages further comprises adjusting the second counter to indicate a number of loaded full pages, wherein loading of any partial page further comprises reinitializing the second counter; and
  determining whether pages of the plurality of pages are a full page by determining whether the second counter exceeds a second constant value.

3. The method of claim 2, further comprising initializing the second counter with the number of full pages m_r1−1, r1 being a selected dimension with potentially partial pages, wherein adjusting the second counter comprises decrementing the second counter, wherein the second constant value is zero or one.

4. The method of claim 2, wherein:
the AI accelerator comprises:
  a first set of registers;
  a second set of registers, wherein a register of the second set of registers is assigned to a respective loop in a machine code being executed by the AI accelerator in order to store a value indicating a current number of iterations of the loop; and
  loop count compare logic configured to:
    compare a content of a register of the first set of registers and an other register of the second set of registers in response to receiving a comparison instruction indicating the two indicated registers; and
    jump to a specific instruction based on the comparing;
  the method further comprises:
  storing the first counter and the second counter in a first register and a second register, respectively, of the first set of registers for the initialization of the first counter and the second register, and executing the linear loading according to a first loop;
  adding in the machine code a dummy iteration loop which is an outer loop of the first loop such that a chunk register of the second set of registers is assigned with the dummy loop such that the dummy loop is executed one time in order to store in the chunk register the first constant value as a number of iterations performed by the dummy loop, the first constant value being equal to the second constant value; and
  executing the machine code, wherein determining whether the number of loaded pages reaches the chunk size comprises executing the comparison instruction indicating the first register and the other register; and
the determining whether the second counter exceeds a second constant value comprises:
  executing the comparison instruction indicating the second register and the chunk register.

5. The method of claim 1, further comprising:
  providing a single machine instruction executable by the AI accelerator to execute the partial loading of the second page as one machine operation.

6. The method of claim 1, further comprising initializing the first counter with the chunk size, wherein adjusting the first counter comprises decrementing the first counter, wherein the first constant value is zero or one.

7. The method of claim 1, further comprising initializing the first counter with zero or one, wherein adjusting the first counter comprises incrementing the first counter, wherein the first constant value is the chunk size.

8. The method of claim 1, wherein: the AI accelerator comprises:
  a first set of registers;
  a second set of registers, wherein a register of the second set of registers is assigned to a respective loop in a machine code being executable by the AI accelerator in order to store a value indicating a current number of iterations of the loop; and
  a loop count compare logic configured to:
    compare a content of a register of the first set of registers and an other register of the second set of registers in response to receiving a comparison instruction indicating the two indicated registers; and
    jump to a specific instruction based on the comparing;
  and the method further comprises:
  storing the first counter in a first register of the first set of registers for the initialization of the first counter;
  executing the linear loading as part of a first loop;
  adding in the machine code a dummy loop which is an outer loop of the first loop such that a chunk register of the second set of registers is assigned with the dummy loop such that the dummy loop is executed one time in order to store in the chunk register the first constant value as a number of iterations performed by the dummy loop; and
  executing the machine code, wherein determining whether the number of loaded pages reaches the chunk size comprises executing the comparison instruction indicating the first register and the chunk register.

9. The method of claim 1, further comprising determining the chunk size as a number of pages that can be processed within a predetermined response time.

10. The method of claim 1, wherein the initial value is the chunk size, zero, or one.

11. A system comprising:
  a processor; and
  a memory in communication with the processor, the memory containing instructions that, when executed by the processor, cause the processor to:

initialize a first counter with an initial value;
linearly load page per page of a n-dimensional tensor comprising a plurality of pages, wherein pages are two-dimensional arrays configured to comprise a predefined number of one-dimensional arrays of sticks and n is an integer;
determine that a first page of the plurality of pages is a full page;
load the first page from a memory using a base address of the first page and determining a respective base address of a first subsequent page using the predefined number of sticks in response to determining that the first page is a full page;
determine that a second page of the plurality of pages is not a full page with only a number of loaded sticks;
partially load the second page by:
  loading non-empty sticks of the second page from the memory using a respective base address of the second page;
  determining a respective base address for a second subsequent page using the number of loaded non-empty sticks and an address offset indicative of empty sticks of the second page;
  storing the partially loaded second page in a memory of an artificial intelligence (AI) accelerator; and
  filling up the partially loaded second page with sticks of dummy values so that the second page becomes a fully loaded second page, wherein the dummy values being provided are such that a processing of the dummy values by the AI accelerator does not generate an exception error or affect results of the processing;
determine that a number of loaded pages reaches a chunk size by comparing the first counter with a first constant value;
reinitialize the first counter with an adjusted initial value in response to determining that the number of loaded pages reaches the chunk size; and
adjust the first counter and continuing the linear loading with another subsequent page upon receiving a continuation signal.

12. The system of claim 11, wherein the n-dimensional tensor comprises n dimensions and per dimension i a predefined number $m\_i$ of the plurality of pages, and the memory containing additional instructions that, when executed by the processor, cause the processor to:
determine a reading direction according to a predefined order of the n dimensions;
initialize a second counter indicating a number of loaded full pages with partial pages, wherein loading each of the loaded full pages further comprises adjusting the second counter to indicate a number of loaded full pages, wherein loading of any partial page further comprises reinitializing the second counter;
determine whether pages of the plurality of pages are a full page by determining whether the second counter exceeds a second constant value.

13. The system of claim 11, the memory containing additional instructions that, when executed by the processor, cause the processor to provide a single machine instruction executable by the accelerator to execute the partial loading of the second page as one machine operation.

14. The system of claim 11, wherein the memory contains additional instructions that, when executed by the processor, cause the processor to initialize the first counter with the chunk size, wherein adjusting the first counter comprises decrementing the first counter, wherein the first constant value is zero or one.

15. The system of claim 11, wherein the memory contains additional instructions that, when executed by the processor, cause the processor to initialize the first counter with zero or one, wherein adjusting the first counter comprises incrementing the first counter, wherein the first constant value is the chunk size.

16. A computer program product comprising a non-transitory computer readable storage medium having program instructions embodied therewith, the program instructions executable by a computer to cause the computer to
initialize a first counter with an initial value;
linearly load page per page of a n-dimensional tensor comprising a plurality of pages, wherein pages are two-dimensional arrays configured to comprise a predefined number of one-dimensional arrays of sticks and n is an integer;
determine that a first page of the plurality of pages is a full page;
load the first page from a memory using a base address of the first page and determining a respective base address of a first subsequent page using the predefined number of sticks in response to determining that the first page is a full page;
determine that a second page of the plurality of pages is not a full page with only a number of loaded sticks;
partially load the second page by:
  loading non-empty sticks of the second page from the memory using a respective base address of the second page;
  determining a respective base address for a second subsequent page using the number of loaded non-empty sticks and an address offset indicative of empty sticks of the second page;
  storing the partially loaded second page in a memory of an artificial intelligence (AI) accelerator; and
  filling up the partially loaded second page with sticks of dummy values so that the second page becomes a fully loaded second page, wherein the dummy values being provided are such that a processing of the dummy values by the AI accelerator does not generate an exception error or affect results of the processing;
determine that a number of loaded pages reaches a chunk size by comparing the first counter with a first constant value;
reinitialize the first counter with an adjusted initial value in response to determining that the number of loaded pages reaches the chunk size; and
adjust the first counter and continuing the linear loading with another subsequent page upon receiving a continuation signal.

* * * * *